June 2, 1964  W. B. RETZ  3,134,996
LEAD SCREW FEED MEANS WITH LEAD SCREW AND NUT MOVABLE
AS A UNIT TO EFFECT FAST APPROACH
Filed Aug. 10, 1959  3 Sheets-Sheet 1
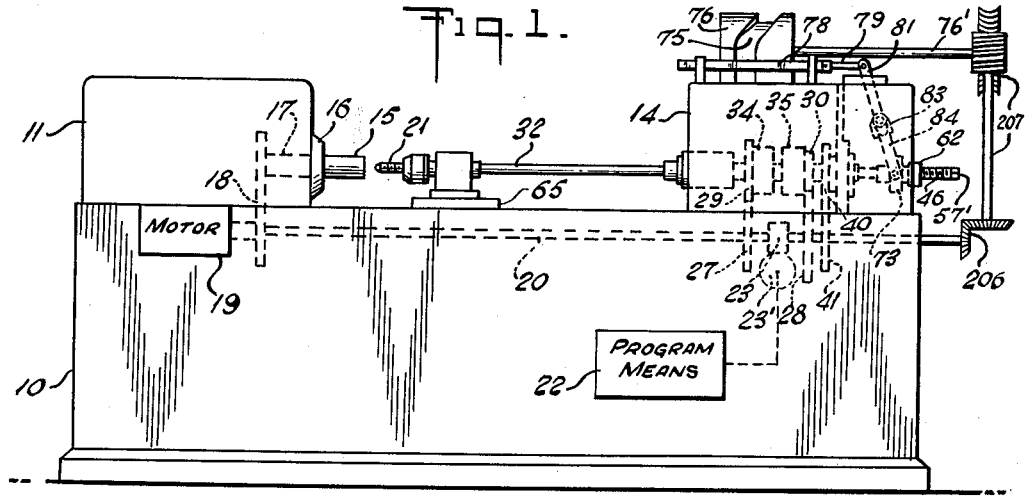
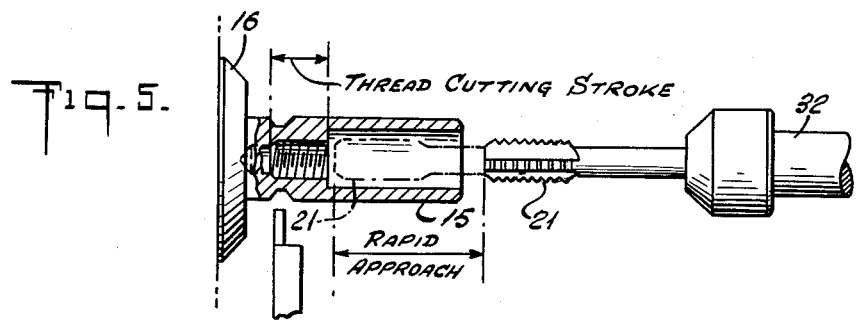
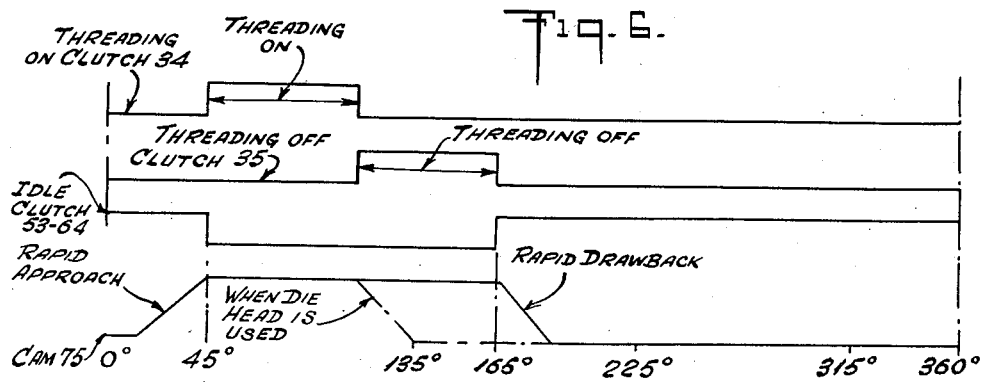
INVENTOR
WILLIAM B. RETZ
BY
ATTORNEYS

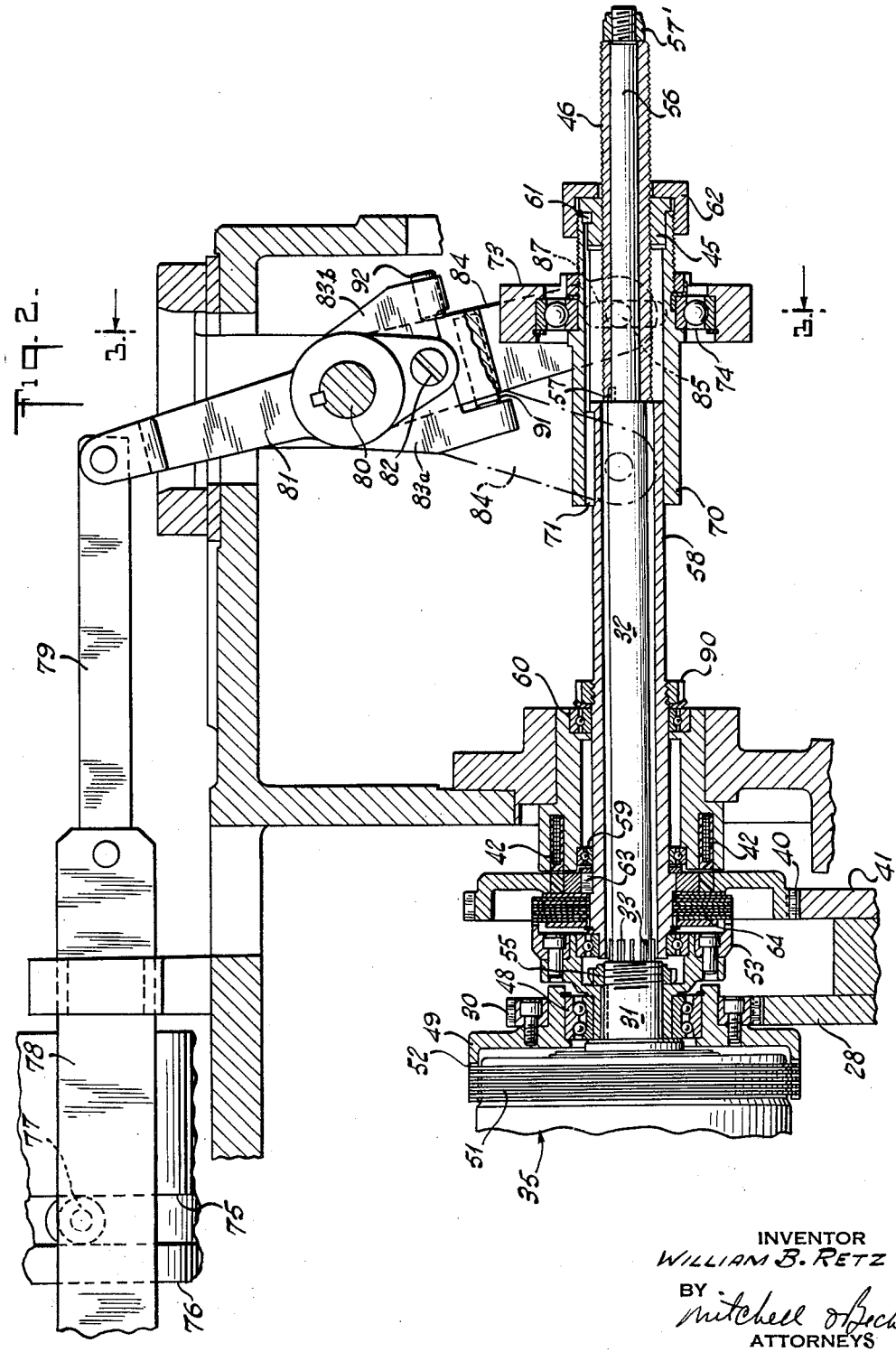

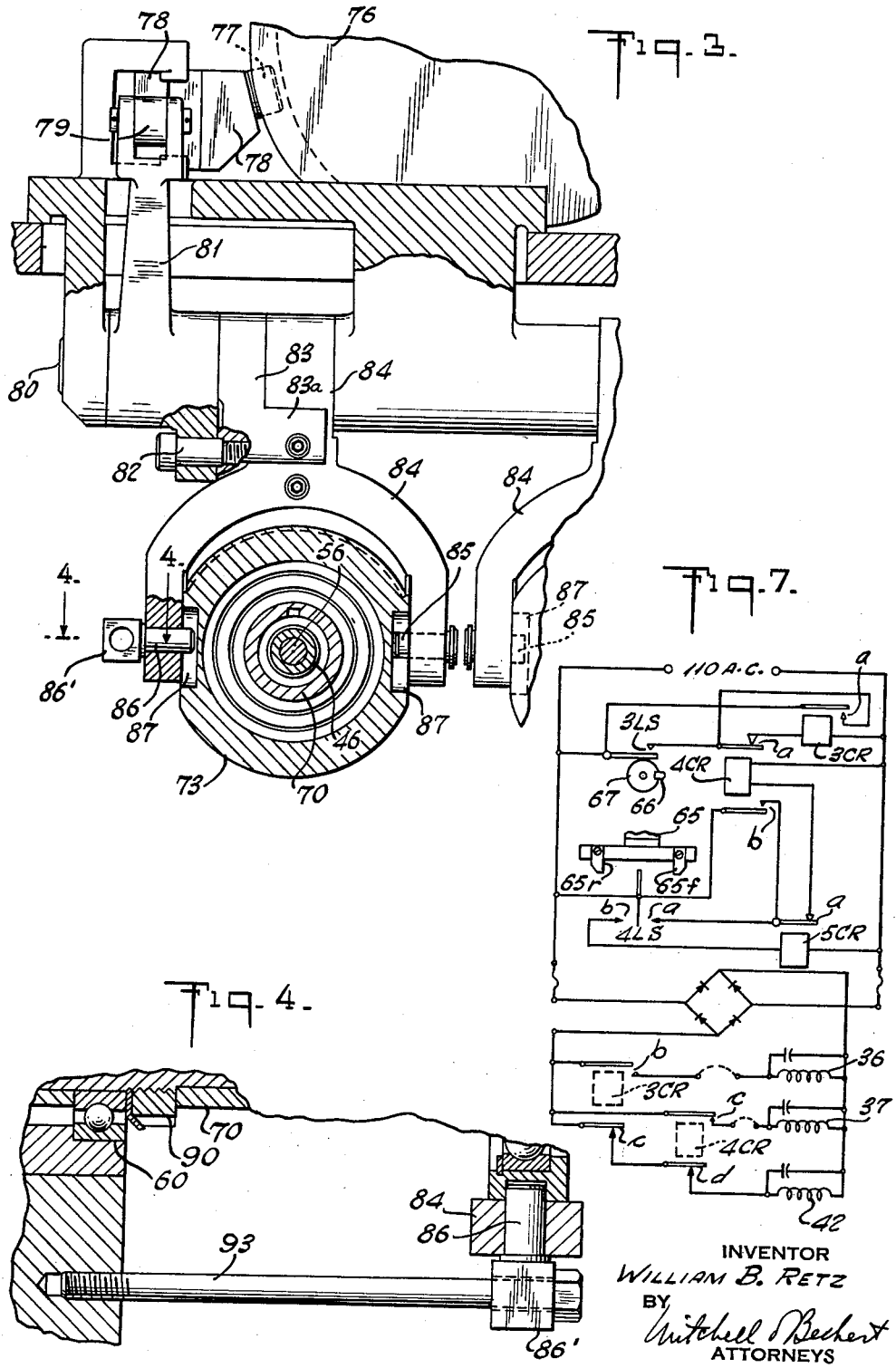

United States Patent Office 3,134,996
Patented June 2, 1964

3,134,996
LEAD SCREW FEED MEANS WITH LEAD SCREW
AND NUT MOVABLE AS A UNIT TO EFFECT
FAST APPROACH
William B. Retz, Plainville, Conn., assignor to The New
Britain Machine Company, New Britain, Conn., a corporation of Connecticut
Filed Aug. 10, 1959, Ser. No. 832,593
10 Claims. (Cl. 10—105)

This invention relates to cyclically operating metal working machines, particularly to such machines having axially movable spindles for threading purposes or the like, and more particularly to a machine equipped with thread cutting mechanism including a lead screw actuated threading spindle. The invention is particularly applicable to cyclically operating metal working machines of the multiple-spindle, indexing-station type, wherein a plurality of tools simultaneously remove metal from the rotating workpieces in the several spindle positions, and wherein the tooling set up may include thread-cutting operations in selected stations in which screw threads are tapped into the previously machined bores of the workpieces as they are successively indexed into the threading station.

The invention is specifically directed to improvements in the threading mechanism disclosed in my copending application Serial No. 807,239, filed April 17, 1959, and now abandoned, which discloses a thread-cutting mechanism of the lead-screw type, in which axial travel of a threading spindle results from the relative rotation between a lead screw and nut and where the lead screw never disengages or threads off the nut.

The feed of a thread cutting tool by lead screw gearing, such as a lead screw and nut, through thread cutting travel results in the production of a superior quality of thread in a workpiece. However, a pure lead screw actuated threading mechanism is comparatively slow. This is because in addition to thread cutting travel of the tool, it must be given auxiliary travel to bring it from a retracted position clear of the workpiece to a threading position and to return it, after thread cutting operation, to the retracted position in order to permit relative indexing between the tool and the workpiece. When the auxiliary travel is effected through operation of the lead screw gearing, such travel occurs at very slow speed in accordance with the thread lead. If the thread is to be cut in the near or front part of a workpiece, the required amount of auxiliary travel is small and the speed at which it occurs does not materially affect the rate of production of the machine. In such and similar cases involving relatively small extents of auxiliary travel of the tool, it is not uneconomical to use the lead screw gearing for determining the entire travel of the tool, auxiliary travel as well as thread cutting travel. It is a different situation when the extent of auxiliary travel is substantial, as when the thread is to be cut in the rear part of a relatively long workpiece. Thus, an automatic metal working machine of the single or multiple spindle type may be set up for the tapping of a bore at the bottom of a counterbore in a long workpiece or for the cutting of external threads by a die head into the rear portion of a long workpiece. In either case, it would not be economical to effect the auxiliary travel of the tool at the slow speed imposed by the lead screw gearing upon the tool during thread cutting travel. In such case, where the auxiliary travel of the tool is substantial, it is desirable in the interest of maximum production to effect the auxiliary travel of the tool without restraint by the lead screw means and as rapidly as possible. At the same time, it is desired to retain the lead screw feed for the tool during thread cutting operation in order to produce a superior quality thread. The invention provides a novel arrangement to satisfy both objectives, that of lead screw feed of the tool for thread cutting and that of rapid auxiliary travel for the tool to and from the threading zone.

In its more general aspect, the invention provides for speeding up production by a cyclically operating metal working or like machine, for effecting such speed-up by a unique combination of slow and fast actuating means for a spindle or tool, the slow means being used during working travel of the spindle or tool and the fast means being used for effecting rapid auxiliary travel of the spindle or tool to and from the working position.

An object of the invention is to provide a lead screw type of threading spindle or the like which can be rapidly advanced to working position and rapidly drawn back after performing work. More specifically, it is intended to provide the lead screw type of spindle with cam controlled rapid travel effecting means for the spindle. It is intended further to provide an arrangement in which the rapid travel means can be deactivated.

In one aspect of the invention, it involves a reciprocable assembly including a spindle, specifically a threading spindle, axially disposed in the direction of assembly travel and connected into the assembly to reciprocate therewith, the spindle also being axially shiftable within or relative to the assembly, both the reciprocation of the assembly and the relative spindle shifts being automatically effected at appropriate times of recurrent machine cycles. According to the invention, the relative axial shifting of the spindle can take place while the spindle is also shifting bodily with the assembly.

Other objects of the invention will appear from the following description, the claims, and the drawings which relate to an illustrative and now preferred embodiment of the invention.

FIG. 1 is a front elevation of a machine incorporating the invention, certain parts being schematically shown.

FIG. 2 is an enlarged sectional view through the rear portion of the threading spindle and through associated elements including rapid travel effecting elements, the spindle and associated elements being shown in retracted positions and the alternative forward position of certain rapid travel effecting parts being also indicated in dot-dash lines.

FIG. 3 is a sectional view taken substantially along line 3—3 of FIG. 2.

FIG. 4 is a section substantially along line 4—4 of FIG. 3 and shows the rapid travel means in deactivated conditioned.

FIG. 5 shows a tap in withdrawn relation to a typical work part which justifies the rapid travel features of the present invention.

FIG. 6 is a timing chart of clutch and cam operations during a machine cycle.

FIG. 7 is a diagrammatic showing of clutch controlling and operating circuits.

As illustrated, the invention is incorporated in a machine such as the one disclosed in my aforementioned copending application, but with certain parts changed and others added in accordance with the invention.

This machine has a base 10 (FIG. 1) with a case 11 on one end and a housing 14 on the other. Supported in the case 11 is a work spindle 17 to which a workpiece, for example, workpiece 15, is chucked at 16, it being understood that work spindle 17 may be one of several arranged in circular array about the central drive shaft of an indexing station type machine as shown in Jobert Patent 2,659,127. The workpiece is operated upon by a thread cutting tool, tap 21 for example, carried by a threading spindle 32. Spindle 32 is supported in housing 14 and extends therefrom in axially opposed relation to the work spindle 17. The work spindle is rotated by connection via gearing 18 to a shaft 20 driven by a motor 19. Shaft 20 also provides drive for the threading spindle 32 but by way of selective clutch means and a sleeve 31 (also see FIG. 2). This sleeve is rotatably mounted by means including a bearing 48 and is held in a fixed axial position by a clamp nut 55. The threading spindle 32 is keyed into the sleeve 31, as indicated by splines 33, so that the spindle will rotate with the sleeve and yet be capable of moving axially relative to the sleeve.

According to the invention, axial travel of threading spindle 32 can be effected slowly during a portion of a machine cycle (FIG. 6) as a result of relative rotation between lead screw and nut elements and can be effected rapidly during another portion of the cycle by means acting to displace the lead nut and screw couple as a unit in a longitudinal direction.

The lead screw 46 is hollow and held by a lock nut 57' onto a rear rod extension 56 of the threading spindle 32. A key 57 connects the lead screw to the threading spindle for common rotation. In maintained engagement with the lead screw 46 is the lead nut 45. A retainer 62 holds the lead nut in place within the outer, or rear, end of a thrust collar or sleeve 70, and a key 61 connects the lead nut to the collar for rotation therewith. Collar 70 receives a sleeve shaft 58 which is journaled concentrically around the threading spindle 32 in spaced bearings 59 and 60. Rotation of the sleeve shaft 58 is communicated to the collar 70 through a key 71 which permits the collar to slide along the sleeve shaft. The thrust collar 70 is an element of the rapid travel effecting means for the threading spindle 32 and slidable movement of the collar along shaft 58 results in longitudinal displacement or axial shifting of the lead nut 45, lead screw 46 and threading spindle 32 as one unit, the lead nut and screw couple here serving as a thrust connection between the thrust collar and the threading spindle.

Slow axial travel of the threading spindle 32 will result on the other hand from relative rotation between the lead nut and screw elements 45 and 46. The lead nut rotation is effected continuously at a single speed by means including a gear 41 fixed on the drive shaft 20 (see also FIG. 1). Gear 41 meshes with a gear 40 keyed at 63 onto the sleeve shaft 58, so that the sleeve shaft is rotated continuously to effect rotation of collar 70 keyed thereon and lead nut 45 fixed into the end of the collar. The lead screw 46 will be always rotated in the same absolute direction as the lead nut but selectively at lower or higher speed than the lead nut according to the required direction of axial travel for the lead screw and threading spindle relative to the lead nut, which always rotates in the same direction and at the same speed as the work spindle 14. Also, means are provided to couple the lead nut and screw together for common rotation when their relative axial position is not to change. This latter coupling means comprises a magnetically operated clutch between the threading spindle driver sleeve 31 and the lead nut driver sleeve 58. The clutch, called the "idle" clutch, includes a driven cup 53, the hub of which is keyed to the sleeve 31. Friction disks 64 are interposed between the sleeve 58 and the cup 53. Upon excitation of a clutch magnet 42, the friction disks 64 are clamped together to couple the cup 53 and hence the sleeve 31 to the sleeve 58 for rotation therewith. Under this condition, the threading spindle 32 and the lead screw 46 will rotate in unison with the lead nut 45 and there will be no change in their relative axial position; that is, the threading spindle will idle as far as the axial travel is concerned.

Assuming that a right hand thread is to be formed in a workpiece, then right hand lead screw and lead nut elements will be used. Rotation of the lead screw at a slower speed than the lead nut will result in advance of the lead screw relative to the lead nut (so that the tap will cut the thread in the workpiece according to the thread lead of lead screw 46), while rotation of the lead screw at higher speed than the nut will produce opposite travel of the lead screw relative to the nut (to screw the tap out of the workpiece after the threading operation is completed). Either the lower or higher rotational speed will be imparted to the lead screw, depending on whether the magnetically operated thread-on clutch 34 or the magnetically operated thread-off clutch 35 is engaged. The thread-off clutch includes a drive member 49 (FIG. 2) pinned to a gear 30 which is driven by a gear 28 fixed on the shaft 20. Friction disks 51 are provided between the member 49 and the sleeve 31, alternate disks being keyed at 52 to member 49 and the intervening disks being suitably keyed to sleeve 31. Excitation of a clutch magnet 37 (FIG. 7) within clutch unit 35, clamps the disks 51 together, coupling the sleeve 31 to drive member 49. Hence, the lead screw will be rotated faster than the lead nut and the direction of relative rotation will be such as to retract the threading spindle from the work spindle 17. The thread-on clutch 34 is similar to thread-off clutch 35. However, drive gear 29 of the thread-on clutch is rotated by gear 27 fixed on shaft 20 at a speed slower than the lead nut. Hence, upon excitation of a clutch magnet 36 (FIG. 7) within clutch unit 34 for engaging the driving and driven elements of the thread-on clutch with each other, the lead screw will be rotated relative to the lead nut in a direction to advance the threading spindle toward the work spindle.

As previously mentioned, the thrust sleeve or collar 70 is an element of the means for effecting rapid travel of the threading spindle. Displacement of the collar along shaft 58 effects similar displacement of the lead nut, the lead screw and threading spindle as a single unit. The means for displacing the collar 70 comprises a drum 76 formed with a box cam groove 75. The drum 76 is fixed to a shaft 76' which is driven from the shaft 20 through one revolution per machine cycle (FIG. 6) by suitable drive connections. Such drive connections may include a bevel gear-drive 206 (FIG. 1) and a worm and wheel drive 207 between the bevel gear end of the gearing 206 and the shaft 76' of cam drum 76. Engaged in cam groove 75 is a follower roller 77 carried by the side of a slide bar 78. This bar is linked by element 79 to a lever 81 which is part of a three-lever rocker assembly carried by a shaft 80 (see FIGS. 2 and 3 as well as FIG. 1). Lever 81 is fixed on shaft 80 while the two other levers 83 and 84 of the assembly are loose on the shaft. A shoulder screw connection 82 ties levers 81 and 83 releasably together. Projecting laterally from lever 83 so as to straddle the medial portion of the lever 84 are a pair of spaced lugs 83a and 83b, engagement between the lugs and the lever 84 being provided by screw studs 91 and 92 so as to permit angular adjustment of the lever 84 relative to lever 83. The lower part of lever 84 is formed as a yoke in non-rotatable, flat-surfaced straddling engagement with a thrust ring 73 which is mounted on the collar 70 in an axially fixed relation thereto by means of anti-friction bearing 74. The yoke arms carry pins 85 and 86 engaged in vertically elongated slots 78 milled in the diametrically opposite, straddled flat sides of thrust ring 73. Through the pin-and-slot connection 85—86—87, the rocking of lever 84 results in displacing ring 73 and, therethrough, the collar 70 along the continuously rotating sleeve shaft 58. This movement of collar 70 is rigidly communicated to lead nut 45 and therethrough to lead screw 46 and threading spindle 32. It may be noted that though ring 73 is non-rotatable, its mounting on collar 70 does not interfere with continuous rotation of the collar.

FIGS. 5 and 6 indicate timing of operations during a machine cycle for the threading by tap 21 of typical workpiece 15. In the early part of the machine cycle, cam 75 acts through follower 77, bar 78 and link 79 to rock lever assembly 81—83—84 clockwise, effecting rapid advance toward work spindle 17 of the reciprocable assembly of ring 73, collar or sleeve 70, lead nut 45, lead screw 46 and threading spindle 32 (see FIG. 2). This advance marks the rapid approach of tap 21 to a position indicated in dot-dash in FIG. 5 and close to the threading zone. The slow travel period of the threading spindle and tap may now begin. Control of clutch operations during this period is effected through actuation of switches 3LS and 4LS shown in the circuit diagram, FIG. 7. Switch 3LS is actuated by a rotatably adjustable dog 66 on a disk 67. This disk is driven through one revolution per machine cycle through program means 22 from a worm wheel 23' which is actuated by a worm 23 on drive shaft 20 same as shown and described in co-pending application Serial No. 807,239. The switch 4LS is a single pole double throw switch biased to normally open status. Actuation of 4LS is effected alternately by a pair of dogs 65f and 65r (FIG. 7) adjustably settable along a slidable support 65 (also see FIG. 1) for the threading spindle 32 and which is collared to the spindle to travel with it to and from the work. To start the slow travel period of the threading spindle and tool, dog 66 closes 3LS, energizing a relay 3CR via back contact a of a relay 4CR. Relay 3CR closes its stick contacts a and also closes contacts b to energize clutch magnet 36, engaging the thread-on clutch 34. As a result, the lead screw 46 is rotated relatively to lead nut 45 in a direction for causing advance of the threading spindle and its feed of the tool 21 through the thread cutting stroke (see FIG. 5). It may be mentioned that the pitch of the lead screw and nut elements is selected to match the pitch of the thread to be cut in the workpiece. When the threading tool has completed the full length of the thread in the workpiece, dog 65f actuates switch 4LS to close switch side a, thereby energizing relay 4CR via back contacts a of relay 5CR. Relay 4CR opens its contacts a to drop the relay 3CR, so that thread-on clutch magnet 36 is deactivated and clutch 34 released. Simultaneously, contacts c of 4CR close to energize magnet 37 for effecting engagement of thread-off clutch 35. The circuit of 4CR holds via stick contacts b of the relay. With clutch 35 engaged, the relative direction of rotation between the lead screw and nut in the same direction is reversed and the threading spindle is consequently retracted, running the threading tool off the thread it has cut in the workpiece. When the tool has been drawn back from the thread with adequate clearance, for example to the dot-dash position in FIG. 5, the dog 65r closes the side b of switch 4LS, so that relay 5CR is energized. The contacts a of 5CR open and break the stick circuit of 4CR. Both 4CR and 3CR now being de-energized, a circuit is completed via their respective, serially connected back contacts d and c through the "idle" clutch magnet 42. As a result, the lead screw 46 and lead nut 45 are coupled together for unitary rotation, no change in their axial relation will now take place, and they will be axially displaceable as a unit.

The rapid retraction of the threading spindle 32 and tool carried thereby may now take place. The release of the thread-off clutch 35 and the engagement of the flow idle clutch 53—64 are timed to occur just before the rapid drawback slope of the cam 75 engages the follower roller 77. As this portion of the cam traverses the follower roller, it causes bar 78 to rock lever assembly 81—83—84 counterclockwise, effecting rapid return of the reciprocable assembly to rear position in which the tool 21 is fully retracted and clear of the workpiece as indicated in full in FIG. 5. Between rapid drawback and rapid approach times, the cam 75 dwells with respect to the follower roller 77. This dwell period may occupy a large share of the machine cycle because of the saving in time resulting from the rapid auxiliary travel of the tool to and from the workpiece or to and from the threading zone of the workpiece. Thus adequate time is afforded by the dwell period during which the tool 21 idles in retracted position for the performance of machine indexing and other ancillary operations. Further, because of the rapid travel feature, the machine cycle may be of shortened duration such as to assure maximum production or maximum work output by the machine.

When external threads are being cut with a self-opening die head, engagement of clutch 35 and the start of rapid drawback may be simultaneous as soon as the die head snaps open to clear the thread chasers from the workpiece so that the spindle 32 threads back to starting position during rapid drawback of the spindle assembly, thus materially shortening the time of the total threading cycle. The cam used in this operation will have an earlier drawback slope, as indicated in dot-dash in FIG. 6, than the cam 75 used for the previous example. This feature is particularly desirable when cutting threads on maximum length piece parts on bar machines wherein the threading tool must be drawn back quickly to clear the bar or stock stop, and also to insure that the finished piece part will drop into the work chute without hanging up on the threading tool after being cut off. With earlier drawback, the total machine cycle duration can be shortened still more, so that the rate of production can be materially increased.

When cutting threads in relatively short workpieces or in the near or front portion of a long workpiece, rapid approach and drawback are not required and the entire axial travel of the threading spindle can be economically effected by rotation of the lead screw and nut relatively to each other. To deactivate the rapid approach and drawback mechanism, the screw 82 (FIGS. 2 and 3) may be removed so as to free the lever 83 from the cam operated lever 81. The reciprocable assembly of ring 73, collar 70, lead nut 45, lead screw 46 and threading spindle 32 can then be set in its fully forward position with the end of the collar 70 abutting the rear face of the nut 90. Then the collar is secured in this abutting position by passing a bolt 93 (FIG. 4) through a bore in head 86' of pin 86 in lever 84 and threading the bolt into the rear wall of the housing 14. The levers 83 and 84, ring 73, collar 70 and lead nut 45 will thus be locked in their foremost positions. Axial travel of the threading spindle now will depend only on relative rotation between the lead nut and screw elements, the direction of travel differing according to which of lead-threaded elements is rotating at higher speed.

While a specific embodiment of the invention has been shown and described, it is to be understood that various changes and substitutions may be made without departing from the scope of the invention. It is intended therefore to be limited only as indicated by the following claims.

What is claimed is:

1. In a cyclically functioning metal working machine or the like, a rotary work spindle, a reciprocable assembly including a tool spindle disposed in the direction of assembly reciprocation and connected into the assembly for axial shift bodily with the assembly upon reciprocative displacement of the assembly, means mounting the assembly for its reciprocative travel, means including a lead-screw connection so supporting the tool spindle as to enable it to be shifted axially relative to the assembly, drive means including drive connections for differentially rotating said work and tool spindles to effect said relative axial shift, and synchronized operative connections through which said drive means cyclically effects both reciprocation of the assembly and the relative axial shifting of the tool spindle at appropriate times of each of recurrent machine cycles.

2. In a metal working machine or the like, a rotary work spindle, a reciprocable assembly including a tool spindle shiftable in position within the assembly in a direction of reciprocative travel of the assembly and further including threaded means operable to effect such shift of the tool spindle, means mounting the assembly for its reciprocative travel, means supporting the tool spindle for its shift in position within the assembly, drive means including drive connections for differentially rotating said work and tool spindles to effect the shift of the tool spindle within the assembly, separate and means operated from said drive means and synchronized with operation of said connections for moving the assembly, including the tool spindle and threaded means, bodily in a direction of reciprocation of the assembly.

3. In a machine of the character indicated, a rotary work spindle, a reciprocable assembly including a thrust member, a tool spindle axially shiftable relative to the thrust member in a direction of reciprocative travel of the assembly, and a threaded lead screw operable to effect such shift of the tool spindle, in combination with drive means, gearing connections coacting with said drive means for differentially rotating said work spindle and said tool spindle whereby said lead screw effects the axial shift of the tool spindle relative to the thrust member, and auxiliary feed means operated from said drive means in timed relation with operation of said gearing connections and for acting upon the thrust member to shift the entire assembly, including thrust member and tool spindle and lead screw, as a unit in a direction of reciprocative travel of the assembly.

4. In a metal working machine or the like, a rotary work spindle, a reciprocable assembly comprising a thrust member, a tool spindle axially shiftable relative to the thrust member in a direction of reciprocatory travel of the assembly, and shift means including coacting threaded elements respectively connected with the thrust member and the spindle to be operated for producing the shift of the spindle relative to the thrust member, in combination with drive means, means coacting with said drive means for differentially rotating said work spindle and said tool spindle whereby said drive means operates the threaded elements to effect the tool spindle shift relative to the thrust member, and means operated by said drive means for displacing the entire assembly, including the thrust member and tool spindle and threaded elements, bodily in a direction of reciprocation of the assembly.

5. In a metal working machine or the like, a rotary work spindle, a reciprocable assembly comprising a rotative member, a tool spindle rotatively and axially movable relative to said member, drive means for differentially rotating said work spindle and said tool spindle, and spindle feed means including coacting lead screw and nut elements one connected with the tool spindle and the other with said member and effective upon relative rotation to produce axial travel of the tool spindle relative to said member, in combination with said drive means, and separate means operated from the drive means for actuating the entire assembly, including said member and tool spindle and spindle feed means, as a unit in a direction of reciprocation of the assembly.

6. In a machine of the character indicated, a rotary work spindle, an axially opposed threading spindle, means supporting the threading spindle for axial travel to and from the work spindle, meshed lead screw and nut elements relatively rotatable to effect axial travel of the threading spindle at a speed dependent on the thread lead of the lead screw and nut elements, drive means for differentially rotating said work spindle and said tool spindle whereby said drive means effects relative rotation between the lead screw and nut elements to produce said axial travel of the threading spindle, and means operated from said drive means for also effecting unitary axial translational displacement of the lead screw and nut elements and the threading spindle.

7. In a cyclically functioning machine of the kind indicated, a rotary work spindle, an axially opposed threading spindle supported for axial travel to and from the work spindle, a thrust member mounted for reciprocation along the axial line of the spindles, meshed lead screw and nut elements interconnecting the thrust member and threading spindle to serve upon relative rotation for axially moving the threading spindle relative to the thrust member and to serve as a thrust connection between the member and the threading spindle for communicating reciprocative travel of the member to the threading spindle, drive means, means connected to the drive means for effecting forward and return strokes of the thrust member at spaced apart cyclic intervals to thereby effect relatively rapid approach and retraction of the threading spindle with respect to a threading zone of the work, and means operated by the drive means during the interval intervening between rapid approach and retraction of the threading spindle for differentially rotating both the lead screw and nut elements in a direction to effect relatively slow threading advance of the threading spindle.

8. A cyclically functioning machine comprising a work spindle, an axially opposed tool spindle carrying a threading tool, a rotative thrust member concentric with the tool spindle, means mounting the thrust member for axial reciprocation, means supporting the tool spindle for axial travel relative to said member, meshed lead screw and nut elements, one connected with the tool spindle and the other with said member to be rotated relatively in either of opposite directions for producing axial advance or retraction of the tool spindle and threading tool thereon with respect to said member and to the work, the lead screw and nut elements also serving as a thrust connection through which reciprocation of the member is communicated to the tool spindle, drive means, mechanism cyclically operated therefrom for imparting forward and return strokes of reciprocation to the thrust member in spaced apart cyclic intervals and thereby to effect comparatively rapid approach and return of the threading tool with respect to a threading zone, and means automatically rendered effective after the rapid approach interval for producing relative rotation of the tool spindle and said member and thereby of the lead screw and nut first in a direction to effect threading advance of the threading tool and then in the reverse direction to retract the tool relative to said member.

9. In a cyclical metal working machine, a work spindle, an axially opposed tool spindle supported for axial travel to and from the work spindle, a rotative thrust member coaxial with the tool spindle and mounted for axial reciprocation, coacting lead screw and nut elements, one connected with the tool spindle and the other with the thrust member to be rotated relatively in either of opposite directions to produce advance or retraction of the tool spindle with respect to said member and work spindle, the lead screw and nut also serving as a thrust connection to transmit reciprocative travel of said member to the tool spindle, drive means, mechanism cyclically operated therefrom and including a cam and cam follower linkage between the cam and thrust member for imparting forward and return strokes of reciprocation to the thrust member in separated intervals of a machine cycle and thereby to effect comparatively rapid approach and return travel of the tool spindle with respect to a work zone, and means operated from the drive means after the rapid approach interval for effecting relative rotation between the tool spindle and thrust member and thereby between the lead screw and nut elements first in a direction to produce working advance of the tool spindle and then in the reverse direction to produce retractive travel of the tool spindle relative to the thrust member.

10. The invention as defined in claim 9, the cam follows linkage including a rockable assembly of a cam actuated lever and of lever means connected with the thrust member and a releasable fastening between the lever and lever means to connect them for common rockable action under cam control so as to produce reciprocative travel of the thrust member, the fastening being releasable to deactivate the lever means and thrust member, and means for releasably retaining the lever means and thrust member in a deactivated position.

References Cited in the file of this patent

UNITED STATES PATENTS

| | | |
|---|---|---|
| 2,069,098 | Rupple | Jan. 26, 1937 |
| 2,327,279 | Mansfield | Aug. 17, 1943 |
| 2,500,540 | Graves | Mar. 14, 1950 |
| 2,770,819 | Jobert | Nov. 20, 1956 |
| 2,887,906 | Grinage | May 26, 1959 |
| 3,013,285 | Arengo | Dec. 19, 1961 |